Feb. 9, 1943. R. GOLD 2,310,422
DYNAMO-ELECTRIC MACHINE
Filed Oct. 25, 1940 2 Sheets-Sheet 1

INVENTOR:
Richard Gold

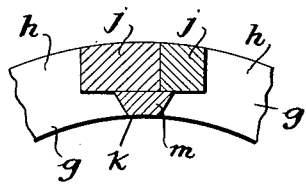
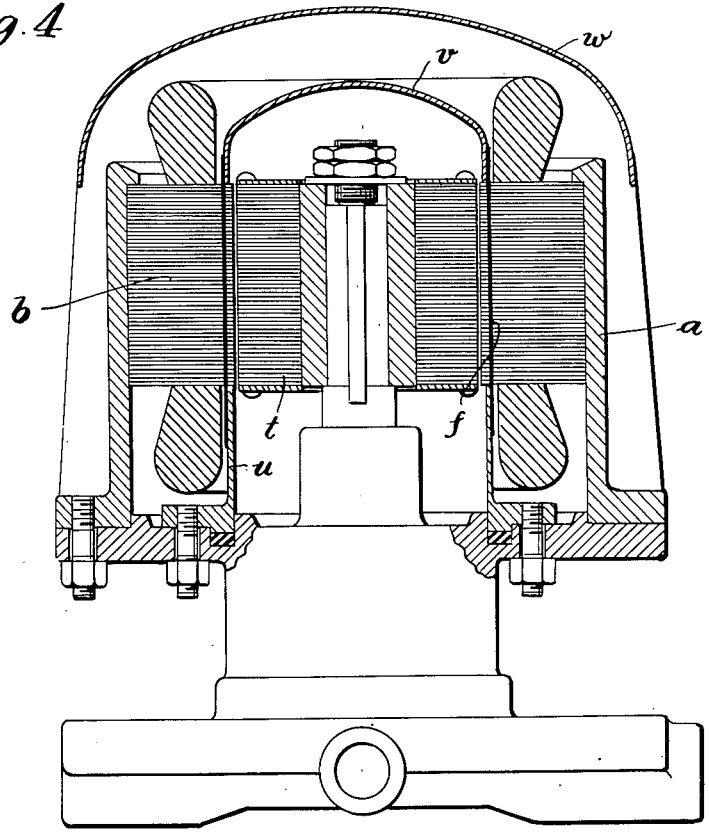

Patented Feb. 9, 1943

2,310,422

UNITED STATES PATENT OFFICE 2,310,422

DYNAMOELECTRIC MACHINE

Richard Gold, Birmingham, England

Application October 25, 1940, Serial No. 362,845
In Great Britain October 26, 1939

5 Claims. (Cl. 171—252)

This invention relates to dynamo-electric machines of the kind in which either the stator, rotor, or other windings are enclosed, for example, to protect them against the action of water or other liquids or of injurious gases.

The object of the invention is to enable the required enclosing of the windings to be effected in a simple and satisfactory manner.

The invention comprises the combination with a pole piece having a cylindrical bore and which is slotted around its inner periphery to receive the stator windings, of a thin tubular lining, and an inner hollow cylindrical securing member, arranged adjacent to the inner periphery of the pole piece for holding the lining in position.

In particular the invention comprises a combination as specified in the preceding paragraph and in which the securing member is formed by alternate pole tips and spacers.

The invention also comprises the combination with the ends of the lining which extend beyond the pole piece, of cylindrical reinforcements.

In the accompanying sheets of explanatory drawings:

Figure 3 is a detail view illustrating a portion of the securing member.

Figure 4 is a longitudinal section illustrating one application of the invention to an electric motor having an enclosed rotor.

Figure 1:
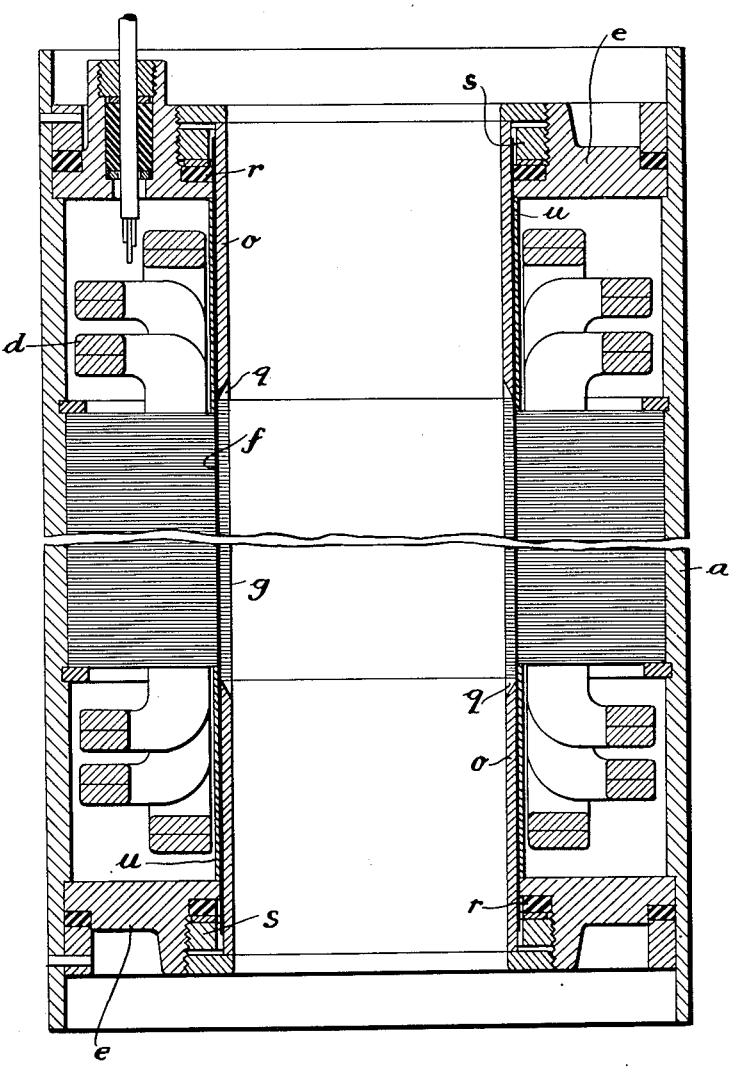
Figure 1 is a longitudinal section illustrating one application of my invention to the stator of a submersible electric motor having enclosed stator windings.
Figure 2:
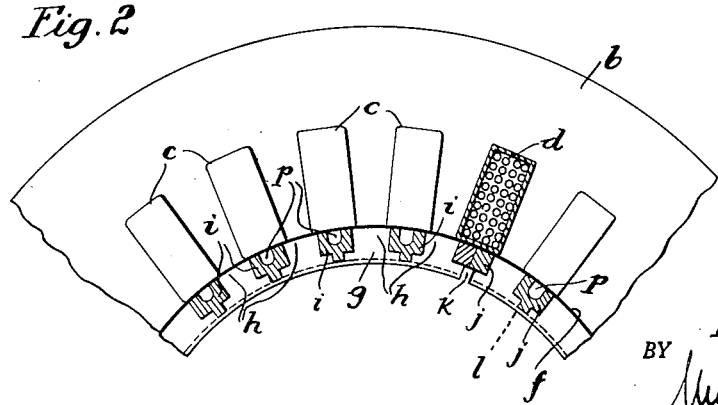
Figure 2 is a sectional plan of a portion of the stator.

Referring to Figures 1 to 3, I mount within a cylindrical case $a$ an annular cylindrical and laminated pole piece $b$ in the inner periphery of which slots $c$ (Figure 2) are formed to accommodate the stator windings $d$. These slots are preferably of rectangular form, and each is open at the end which intersects the inner peripheral surface of the pole piece. The ends of the windings which extend beyond the pole piece are accommodated in spaces bounded in part by the casing $a$ and end covers $e$ formed on or secured to the casing.

The enclosing of the stator windings is effected by a thin tubular metal lining $f$ arranged to fit closely against the inner periphery of the pole piece and to extend from one end cover to the other. The lining may be made from any convenient magnetic or non-magnetic metal, but preferably non-magnetic metal of high tensile strength is used and it is desirable that its electrical resistance shall be as high as possible.

The lining is held in position by an inner hollow cylindrical securing member constructed from alternate laminated pole tips and longitudinal spacers, one or more of the latter being adapted to act as wedges. The length of this member is substantially the same as that of the pole piece, and can be made to extend slightly beyond the ends of the pole piece as indicated in Figure 1.

The iron portion $g$ of the securing member may be conveniently constructed from an assembly of annular laminations each formed around its outer periphery with gaps suitably shaped to form the pole tips $h$ and accommodate the spacers $i$, the latter being preferably made from insulating material of the resinoid type. In assembling the components of the securing member the rings of the iron portion are mounted on a mandrel and the spacers are then placed in position. The assembly is then ground on its outer surface to a diameter which will enable it to fit tightly the interior of the lining tube $f$. In the process of stamping the iron laminations one of the narrow bridges joining the pole tips and forming the inner periphery of the laminations is severed as indicated at $k$ in Figure 2 so as to make the laminations expansible. Alternatively, after the laminations and spacers have been assembled a slot may be cut along the assembly at the position indicated by $k$. The spacer which is placed in the spacer slot adjacent to the slot $k$ (and indicated by $j$ in Figure 2) is made in the form of a pair of wedges one or both of which may be made from non-magnetic metal of high electrical resistance. After the assembly has been prepared as above described the wedges are removed and the assembly is detached from the mandrel, and due to the slot $k$ the assembly then shrinks in diameter slightly, and is thus enabled to be easily inserted inside the lining which has already been placed in position. After the securing member has been accurately located in the lining with its pole tips properly related to the pole tips of the pole piece $b$ the wedges $j$ are re-inserted and tightened causing the securing member to expand and press the lining into intimate contact with the pole piece $b$. Finally the inner periphery of the securing member may be subjected to a grinding or turning operation for the removal of the thin bridges which unite the pole tips of this member thus separating the pole tips. The inner periphery of the supporting member obtained by this operation is indicated by the dotted line $l$ in Figure 2. The separated pole tips are held in position in tight contact with the lining by the action of the wedges. If desired the slot *k* may finally be filled in by a non-magnetic or insulating filling strip *m* (Figure 3). The slot *k* may be formed with parallel sides as shown in Figure 2 or with relatively inclined sides as shown in Figure 3.

Each end portion of the lining extending beyond the pole piece is reinforced by an outer metal or other sleeve *u* and an inner metal or other bush *o*. The latter is made approximately the same thickness as the securing member above described.

A longitudinal groove may be formed along the inner faces of some or all the spacers in contact with the lining to form a channel *p* for cooling liquid or air, and in the adjacent end of each bush *o* notches *q* are formed opposite the grooves to permit the flow of cooling medium into and out of the grooves. When such provision for cooling is not required the said grooves and notches are omitted.

For sealing of the ends of the lining which enter the end covers of the casing any convenient means may be used. Preferably we employ rubber or other rings *r* mounted in recesses in the end covers, and compressed tightly into position by metal pressure rings *s* screwed to the end covers.

In the application of the invention as shown in Figure 4 to an electric motor in which it is required to enclose only the rotor *t* we employ a stator pole piece *b* as above described, and we mount this in a casing *a* which is open and which allows free circulation of air or other cooling medium around the stator windings. The lining *f* is secured within the pole piece by a securing member in the manner above described. The end of the lining which extends beyond one end of the pole piece is tightly secured to an annular reinforcement *u* which forms part of the rotor enclosure, and the other end of the lining which extends beyond the other end of the pole piece is tightly secured to a reinforcing cap *v* which serves to enclose the adjacent end of the rotor. Oven the open end of the stator may be mounted a dust cowl *w*.

It is already known to employ a thin metal lining to enclose the stator windings of a motor. By the present invention we are able to use a thinner lining than heretofore and support it adequately against deformation or other injurious action. The use of a very thin lining enables us to minimise eddy current losses, and also to employ a narrow air gap between the stator and the rotor, thus increasing electrical efficiency.

The invention is not limited to the examples above described and subordinate constructional details may be varied to suit different requirements. Also the invention is applicable to other forms of dynamo-electric machines than those above described as examples.

Without further analysis the foregoing will so fully reveal the gist of my invention that others can by applying current knowledge readily adapt it for various applications without omitting features, that, from the standpoint of the prior art fairly constitute essential characteristics of the generic or specific aspects of my invention, and therefore such adaptations should and are intended to be comprehended within the meaning and range of equivalency of the following claims.

What I claim is:

1. In a dynamo-electric machine in combination a laminated annular pole piece, having a cylindrical bore and being slotted around its inner periphery to receive the stator windings, a thin tubular lining fitted within said bore of the pole piece, an inner hollow expansible cylindrical securing member arranged within said lining for supporting the same internally, and means holding said securing member in expanded state pressed against said lining.

2. In a dynamo-electric machine in combination a laminated annular pole piece having a cylindrical bore and being slotted around its inner periphery to receive the stator windings, a thin tubular lining fitted within said bore of the pole piece, a tubular securing member arranged within said lining for supporting the same internally, at least one slot in said tubular securing member extending in axial direction thereof, and at least one wedge member in said slot for forcing the slot edges from each other thereby expanding said tubular securing member and holding the same in expanded position pressed against said lining.

3. In a dynamo-electric machine an annular pole piece having a cylindrical bore and being slotted around its inner periphery to receive the stator windings, a thin tubular lining fitted within said pole piece, a tubular securing member arranged inside of said lining supporting the same internally, said securing member consisting of rows of superimposed pole tips, spacer members arranged betwen said rows of superimposed pole tips, and substituted for one of said spacer members at least one wedge arranged in axial direction of said securing member in such a manner as to be adapted to slide between the adjacent rows of superimposed pole tips, thereby expanding said securing member and pressing the same against said lining.

4. In a dynamo-electric machine an annular pole piece having a cylindrical bore and being slotted around its inner periphery to receive the stator windings, a thin tubular lining fitted within said pole piece, a tubular securing member arranged inside of said lining supporting the same internally, said securing member consisting of alternate rows of superimposed pole tips, spacers arranged between said rows of superimposed pole tips, and substituted for one of said spacers two cooperating wedges arranged in axial direction of said securing member in such a manner as to be adapted to slide between adjacent rows of superimposed pole tips, thereby expanding said securing member and pressing the same against said lining.

5. In a dynamo-electric machine, a laminated annular pole piece having a cylindrical bore and being slotted around its inner periphery to receive the stator windings, a thin tubular lining fitted within said pole piece, a tubular securing member being made of magnetically permeable material and arranged inside of said thin tubular lining, supporting the same internally, said securing member consisting of alternate rows of superimposed pole tips, spacers arranged between said rows of superimposed pole tips, and substituted for one of said spacers two cooperating wedges arranged in axial direction of said securing member in such a manner as to be adapted to slide between adjacent rows of superimposed pole tips, thereby expanding said securing member and pressing the same against said lining.

RICHARD GOLD.